Nov. 10, 1931.   R. O. HENDRICKSON   1,830,874
DRAWBAR FOR TRACTORS
Filed March 13, 1929

INVENTOR.
ROBERT O. HENDRICKSON
BY James A. Walsh
ATTORNEY

Patented Nov. 10, 1931

1,830,874

UNITED STATES PATENT OFFICE

ROBERT O. HENDRICKSON, OF RACINE, WISCONSIN, ASSIGNOR TO J. I. CASE COMPANY, OF RACINE, WISCONSIN, A CORPORATION

DRAWBAR FOR TRACTORS

Application filed March 13, 1929. Serial No. 346,750.

My invention relates particularly to a tractor drawbar which may be automatically locked when a tractor is pushing its load rearwardly, my object being to provide means whereby the drawbar is automatically prevented from buckling, or pulling sidewise, and also means permitting the drawbar to freely swing radially without undue wear on parts associated therewith; and a further object is to so couple a series of tractors as to eliminate transmission of the pulling power directly through the frames of the various tractors in the series, and reduce the tensional strain therebetween to a negligible degree, as will hereinafter more fully appear.

In the operation of self-propelled vehicles, such as tractors and the like, it is well known that when the tractor is pulling a load, the drawbar thereof freely swings radially from its pivotal point to compensate for the turning action of the tractor in relation to the pulled implement or load as the tractor turns corners. When a tractor is pushing an implement attached thereto, that is, moving it rearwardly, as becomes necessary at times during plowing operations when it is required to release the plow from immovable obstructions such as hidden stones or roots, the tendency of the drawbar is to buckle or jack-knife upon itself so that parts thereof become bent or twisted out of shape unless suitable provision is made to lock the drawbar in stationary position. It is quite common to employ a number of tractors connected in series or tandem for pulling extremely heavy loads, in which circumstances it is well known that those tractors at the rear of the series are subject to undue tensional strain from the pull of the fore tractors transmitted through the frames of the succeeding tractors to their respective drawbars.

Figure 1:
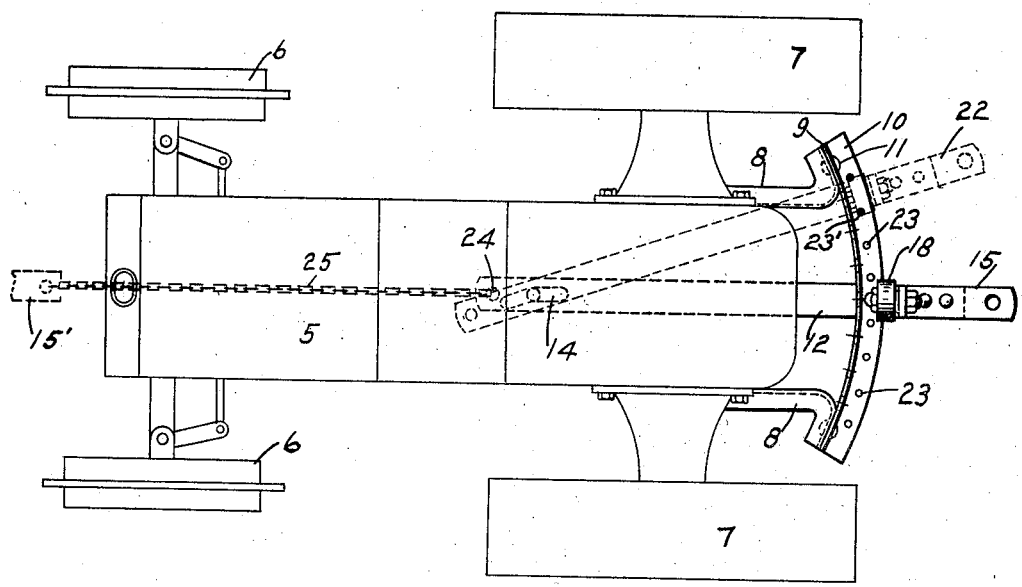
Figure 2:
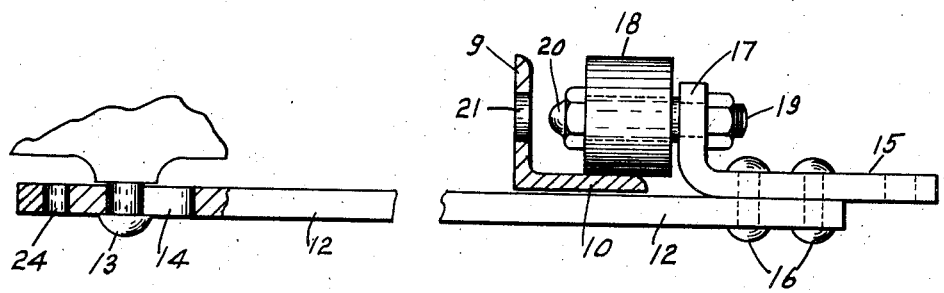
Figure 3:
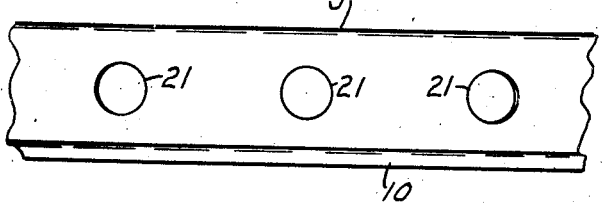

In the accompanying drawings, forming part hereof, Figure 1 is a plan view of a tractor showing my improved drawbar attached thereto; Fig. 2, an enlarged side elevation of my improvement, partly in section, the drawbar being broken to reduce the structure in length for the purpose of showing the parts associated therewith, and Fig. 3 is a fragmentary view of the guide as seen when looking forwardly from behind the tractor.

In said drawings, the portions marked 5 indicate the body of a tractor, to which the front wheels 6 and the rear wheels 7 are attached in a desired manner, and to which body 5 I secure supporting members 8 to which the drawbar guide 9, 10, preferably composed of an angle-iron bent into the desired shape, is riveted or bolted, as shown at 11 in Fig. 1.

The drawbar 12 is pivotally connected, as at 13, to the tractor body, a slot 14 being provided in the drawbar whereby the latter is free to move longitudinally and forwardly as the tractor moves backwardly against a resisting element. A bracket 15 is secured to the rear end of the drawbar, at 16, said bracket having an upturned member 17 constituting a bearing for a roller 18, which latter is rotatably mounted upon a bolt 19, the forward end 20 of the bolt being tapered for a purpose to appear, said bracket and roller constituting a carrier for conducting the drawbar along the guide. The roller 18 transmits the weight of the drawbar to guide 9, 10, and, as indicated, rotates on the bolt 19 as the rear end of the drawbar swings laterally on the guide in a horizontal direction, when a tractor draws or pulls an implement or the like, due to inequalities in the draft of such implement, and, as said roller is free to rotate, it will be understood that friction between and wear of the parts is materially reduced. In the upright member 9 of the guide I provide a series of holes 21, as indicated in Fig. 3, so that as the tractor is moving backwardly against resistance the tapered end 20 of the bolt 19 will enter one of the series of holes 21 and engage therewith and thus lock the drawbar in fixed position so long as the rearward motion is continued, as indicated by the dotted lines 22 in Fig. 1.

In the horizontal leg 10 of the guide I provide a series of holes 23 for the purpose of locking the drawbar 12 at any desired angle or position to compensate for side draft when pulling implements such as harvesters, binders and the like, which is accomplished by inserting bolts or pins 23' into said holes 23 at each side of the drawbar by which means the latter is prevented from swinging laterally in either direction but which may be shifted longitudinally between the pins.

In the front end of drawbar 12 a hole 24 is provided through which a chain or rope 25 can be fastened, the opposite end of which chain or rope is attached to the drawbar 15' of the preceding tractor, by which means I am enabled to connect a series of tractors together to pull one load, thus eliminating transmission of the tensional pull through the respective frames of the tractors as is now common and resulting in distortion of the frames and misalinement of the tractor bearings.

I claim as my invention:

The combination, with a tractor, of supports secured thereto, a guide immovably mounted on the supports, a drawbar pivotally connected to the tractor adapted to be shifted longitudinally and swung laterally in relation thereto, a carrier embodying a roller associated with the drawbar and adapted to travel along said guide as the drawbar is moved laterally in relation to the guide, said guide having means whereby when the tractor is moved rearwardly the carrier will become engaged with and prevented by the guide from moving laterally and also whereby when the tractor is moved forwardly the carrier will be released from engagement with the guide so that the drawbar will swing laterally in relation thereto.

In testimony whereof I affix my signature.

ROBERT O. HENDRICKSON.